June 25, 1968     E. HAILE     3,389,499
PLANTING WALL
Filed Oct. 20, 1966     2 Sheets-Sheet 1
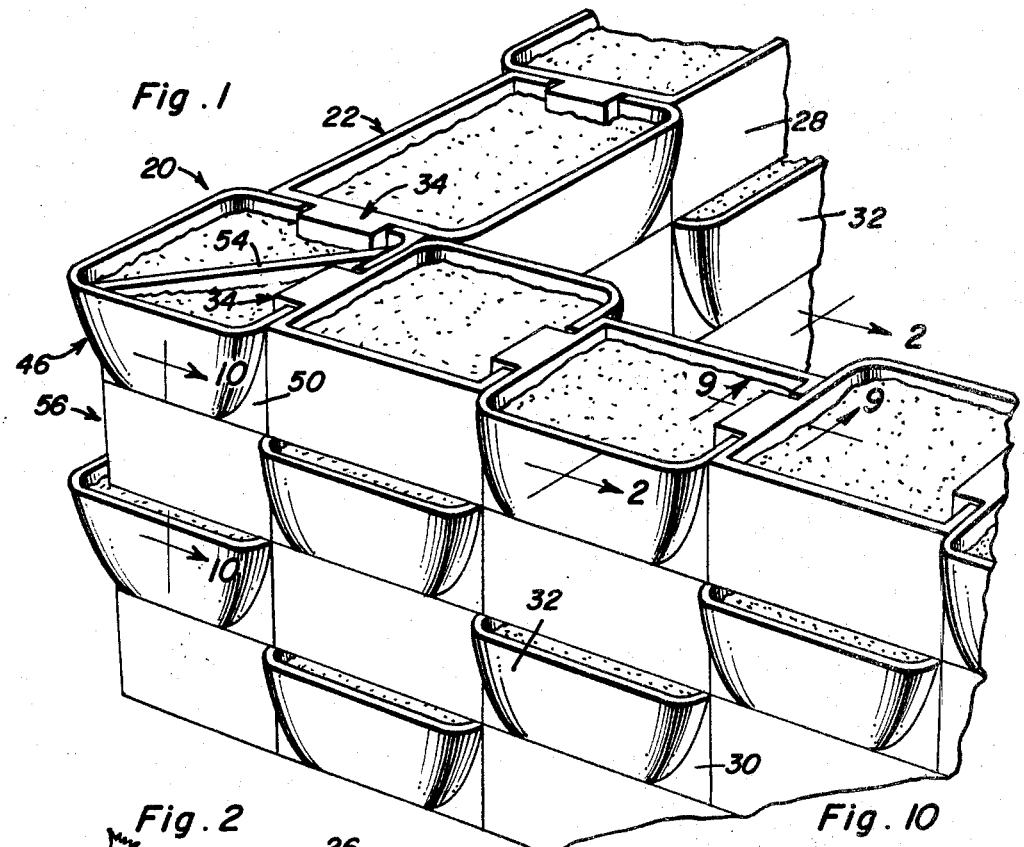
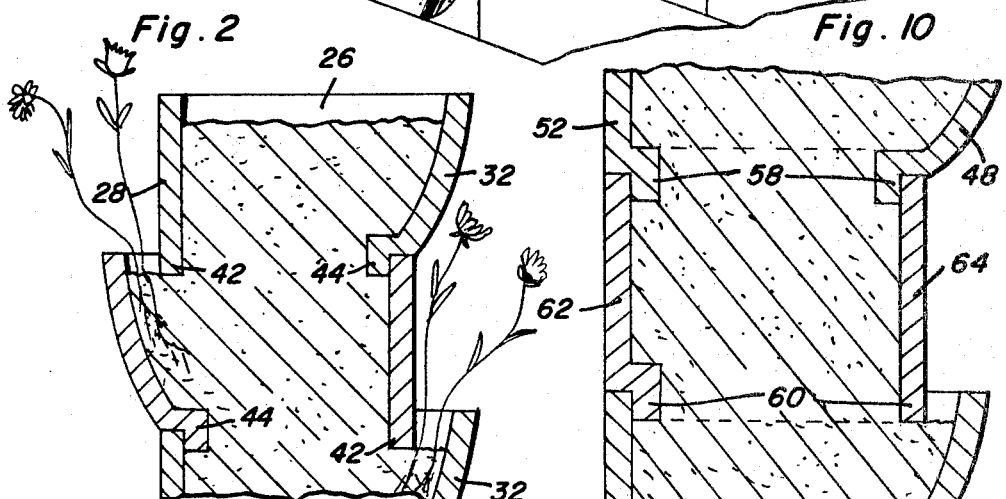
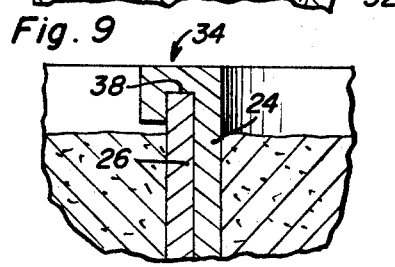
Ernest Haile
INVENTOR.

June 25, 1968   E. HAILE   3,389,499
PLANTING WALL
Filed Oct. 20, 1966   2 Sheets-Sheet 2
Fig. 3
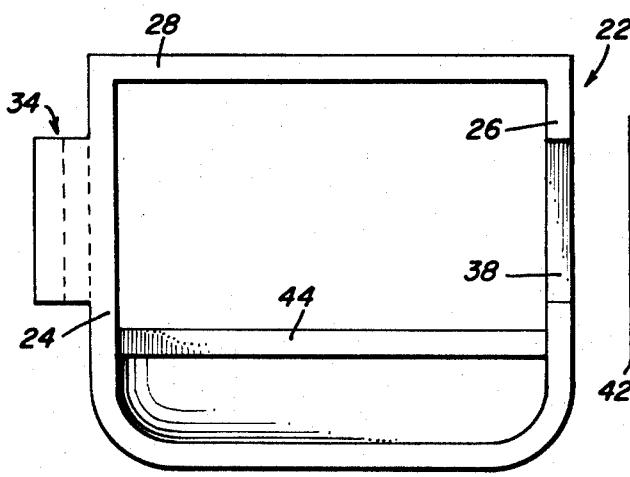
Fig. 4
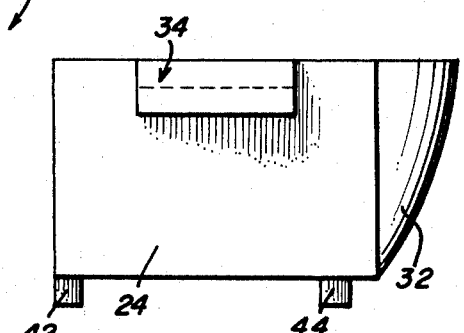
Fig. 5
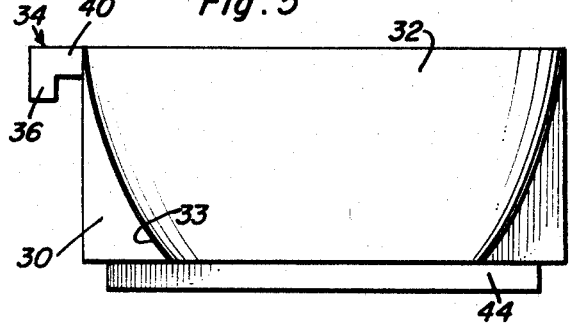
Fig. 6
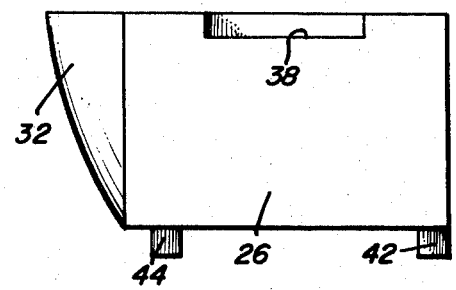
Fig. 8
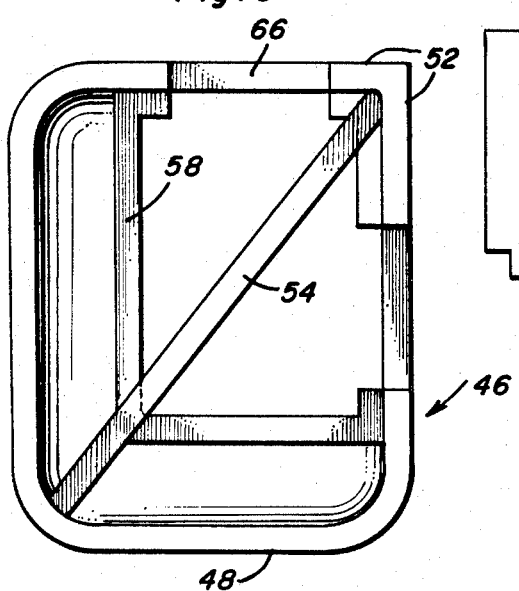
Fig. 7
Ernest Haile
INVENTOR.
BY *Clarence A. O'Brien*
and *Harvey B. Jacobson*
Attorneys 3,389,499
PLANTING WALL
Ernest Haile, 30 Cadwalader Terrace,
Trenton, N.J. 08618
Filed Oct. 20, 1966, Ser. No. 588,112
7 Claims. (Cl. 47—33)

ABSTRACT OF THE DISCLOSURE

This invention comprises a planting wall having vertically spaced blocks adapted to contain soil and plants. The blocks are laterally staggered, locked together, and form a wall that may be planted on both sides, to provide a sturdy but attractive structure.

---

The present invention relates to new and useful improvements in planting walls and the individual blocks utilized in the construction thereof.

It is a primary object of the instant invention to provide a block which is particularly adapted for use together with a plurality of similar blocks in the formation of an interlocked wall construction incorporating a plurality of laterally directed planting troughs in conjunction with a central earth filled core.

Another significant object of the instant invention is to provide a planting wall which presents a highly decorative appearance thereby having particular utility as a means for attractively setting off various areas, such as walks, gardens, patios, etc.

Further, it is a significant object of the instant invention to provide a planting wall which can be quickly and easily erected utilizing unskilled labor in light of the mortarless interlocking nature of the blocks.

Likewise, an important object of the instant invention resides in the provision of planting blocks which can be arranged in a variety of combinations so as to vary the appearance of the planting wall as desired.

Also, an important object of the instant invention resides in the provision of a planting block which defines a hollow interior planting chamber extending vertically completely therethrough and of a size encompassing the major portion of the block.

In conjunction with the above object, it is also an object of the instant invention to provide a planting wall wherein substantially the entire interior thereof is hollow for the reception of earth or the like as a plant growing medium.

Basically, the block of the instant invention is rectangular in shape and consists of opposed flat planar end walls and opposed side walls defining a hollow chamber extending completely through the block. One of the side walls includes an enlarged outwardly bowed portion which defines a lateral enlargement in the interior chamber. This lateral enlargement opens upwardly so as to provide a planting trough or pocket outward of the face of the erected wall. Each of the side walls is provided with a depending stacking flange for engagement within a subjacent block, while one end wall is provided with a laterally projecting locking lug and the other end wall of each block includes a lug receiving recess therein. The described block can be used in conjunction with a plurality of similar blocks in the construction of a planting wall or can, if so desired, be utilized in conjunction with a plurality of blocks wherein the second side wall can include the outwardly bowed portion so as to, upon the alternate use of the two types, present a planting wall having the defined planting troughs laterally directed from opposite sides of the wall. Further, the instant invention contemplates the utilization of a corner block wherein the exposed sides thereof will both incorporate laterally enlarged portions so as to define a right angular trough complementing the troughs to be defined along the longitudinal portions of the wall.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a planting wall incorporating the features of the instant invention therein;

FIGURE 2 is an enlarged cross-sectional view taken substantially on a plane passing along line 2—2 in FIGURE 1;

FIGURE 3 is a top plan view of a typical planting block utilized in the construction of the wall of FIGURE 1;

FIGURE 4 is an end elevational view of the block;

FIGURE 5 is a side elevational view of the block;

FIGURE 6 is an end elevational view of the second end of the block;

FIGURE 7 is a side elevational view of the other side of the block;

FIGURE 8 is a top plan view of a typical corner block;

FIGURE 9 is an enlarged partial cross-sectional view taken substantially on a plane passing along line 9—9 in FIGURE 1; and FIGURE 10 is an enlarged partial cross-sectional view taken substantially on a plane passing along line 10—10 in FIGURE 1.

Referring now more specifically to the drawings, reference numeral 20 is used to generally designate a planting wall made in accordance with the instant invention. Reference numeral 22 has been used to designate a typical planting block utilized in the construction of the wall 20.

The block 22, a plurality of such blocks being utilized in the construction of the wall 20, is generally rectangular in shape and includes opposed spaced flat parallel end walls 24 and 26. In addition, the block 22 includes opposed parallel side walls 28 and 30, the side wall 30 constituting the front face or front wall of the block 22 and including a forwardly bowed portion 32 constituting the major portion of the front wall 30. The rear side wall 28 will normally be planar throughout the extent thereof. With reference to FIGURES 2 and 4 it will be noted that the outwardly bowed portion 32 of the front wall 30 curves gradually outwardly and upwardly from the lower edge of the front wall 30 to a point coplanar with the top edges of the rear and end walls 28, 24 and 26. With reference to FIGURES 3 and 5, it will be noted that the outwardly bowed portion, at the upper end thereof, is of a width substantially equal to the width of the block 22 itself and presents a relatively straight upper edge along a major portion of this width, curving sharply in toward the upper portions of the opposed end walls 24 and 26. The width of the outwardly projecting portion 32 gradually decreases toward the lower edge of the front wall 30 through opposed inwardly curving edges 33 so as to define, in conjunction with the upwardly and outwardly bowed front face of the portion 32, a generally circular planting trough laterally communicating with and constituting a lateral enlargement of the main vertical chamber defined completely through the block 22.

In order to effect a mortarless lateral interlocking of the blocks 22, the end wall 24 of each of the blocks 22 is provided with a laterally projecting elongated locking lug 34. This locking lug 34 includes a depending lip 36 thereon positioned outwardly from the wall 24 a distance substantially equal to the thickness of the end wall 26 for the reception of the end wall 26 of an adjoining block 22, the lip 36 being engaged within the internal chamber of the adjoining block. The end wall 26 of each block 22, which is to receive the locking lug 34 of an adjoining block 22, is provided with an elongated recess 38 therein of a length and depth corresponding to that of the horizontal portion 40 of the locking lug 34 so as to provide for a seat therefor. In this manner, through an engagement of the horizontal portion 40 of a locking lug 34 within the recess 38 of an adjoining block, and through the reception of the end wall 26, below the recess 38, of the adjoining block between the depending lip or flange 36 and the end wall 24 of the first block, a positive interlocking of the adjoining blocks is effected without the necessity of utilizing any bonding agent. As will be appreciated from FIGURE 9, the interlocked lug 34 and recess 38 present an upper surface coplanar with that of the remainder of the blocks 22 thereby providing a smooth seat for the superjacent blocks.

In order to interlock each of the blocks 22 with a subjacent block, integral depending stacking flanges 42 and 44 are provided on the rear and front side walls 28 and 30, these flanges 42 and 44 being of a length generally equal to the length of the internal planting chamber between the end walls 24 and 26 for snug reception between the end walls of a subjacent block.

When the block 22 is used in conjunction with a plurality of duplicate blocks, the trough defining portions 32 all appearing to the same side of the wall, the front wall stacking flange 44 will depend coplanar with the corresponding front wall 30 and be received within the laterally enlarged portion of the chamber of the subjacent block 22 defined by the outwardly bowed portion 32 of the subjacent block. At the same time, the stacking flange 42 associated with the rear wall 28 of the upper block 22 will be offset inwardly a distance equal to the thickness of the rear wall 28 so as to be received just inward of the rear wall 28 of the subjacent block 22, thereby locking the blocks together and providing a smooth rear face to the wall. However, in the preferred type of planter wall 20, illustrated in the drawings, the above described block 22 will be constructed in two basic forms, one wherein the outwardly bowed portion 32 is associated with the front wall 30 and one wherein a similar outwardly bowed portion is associated solely with the rear wall 28. Thus, through both a vertical and a longitudinal alternating of the blocks, spaced planting troughs can be provided on both faces of the wall 20 as clearly illustrated in FIGURE 1. With this type of arrangement, the stacking flanges 42 and 44 will be provided as illustrated with the rear wall flange 42 being coplanar with the rear wall and received within the laterally enlarged portion of the subjacent block chamber and with the stacking flange 44 being offset inwardly the width of the subjacent planar wall for reception just inward thereof. Both stacking flanges 42 and 44, terminating inward of the spaced end walls 24 and 26, enable the end walls to sit directly upon the end walls of the subjacent thus presenting, aside from the presence of the trough defining portions 32, the appearance of a stacked block wall.

The instant invention also contemplates the provision of corner blocks 46 to be utilized in conjunction with the blocks 22 for defining a corner in the planting wall 20. The corner blocks 46 will have an outwardly bowed portion 48, similar to the aforedescribed portion 32, associated with both of the exposed walls 50 thereof with the hidden or block abutting walls 52 being flat for abutting engagement against the end walls 24 and 26 of the adjacent blocks 22. The enlarged portions 48 will, similar to the enlarged portions 32, curve upwardly and outwardly from the lower edges of the walls 50 so as to define a right angular lateral enlargement to the internal chamber defined by the walls 50 and 52 through the corner block 46 with these enlarged portions 48 at the same time defining a right angular trough in the completed wall will be appreciated from FIGURE 1. The corner block 46 also includes a diagonal bracing wall 54 extending from the corner defined between the two outer walls 50 diagonally across the blocks 46 to the corner defined by the two inner walls 52. This bracing wall 54 will be downwardly offset from the top of the block 46 so as to allow for the accommodation of the stacking flanges of the superjacent block.

With reference to FIGURES 1 and 10, it will be noted that in the preferred construction, the corner block 46 will alternate with a second type of corner block 56 which is defined by four planar right angularly related walls having no laterally enlarged or bowed portions similar to the portions 48 of the block 46. In this manner, the alternating pattern prevalent throughout the rest of the wall 20 will be maintained at the corners.

The stacking flanges 58 associated with the corner blocks 46 are to be offset inwardly, note in particular FIGURES 8 and 10, for accommodation in the subjacent rectangular block 56 associated with each block 46. It will be noted that the stacking flanges 58 of each corner block 46 are provided substantially completely about the block 46 for engagement within the subjacent block 56 and, assuming the provision of a diagonal bracing wall 54 within the block 56, in seated engagement upon the recessed upper edge thereof, thereby providing for a stabilization of the outer corner of the corner blocks. The stacking flanges 60 associated with the corner blocks 56 will similarly be provided for reception within subjacent trough defining corner blocks 46. As such, the stacking flanges 60 integral with the inner or hidden walls 62 of each block 56 will be laterally offset inward the thickness of the subjacent inner wall 52 of a block 46 while the stacking flange 60 associated with each of the outer walls 64 of the block 56 will be coplanar therewith and continue from a point inward of the corresponding end wall up to the outer corner defined by the two outer walls 64 for reception within the enlarged portion of the subjacent block 46 and resting engagement upon the bracing wall 54 therein. Further, and assuming the provision of diagonal bracing palls 54 in both types of corner blocks 46 and 56, the lower edges of the bracing walls 54 can be coextensive with the lower edges of the stacking flanges 58 or 60 and rest directly upon the upper edge of a subjacent bracing wall 54 thereby providing additional structural stability.

In order to effect a positive locking of the corner blocks 46 and 56 to the adjacent wall defining blocks 22, it will be noted from FIGURES 1 and 8 that both inner walls 52 of the block 46, the same also applying to the inner walls 62 of the blocks 56, are provided with central recesses 66 corresponding in size, shape and location to the recesses 38 for the reception of the locking lugs 34 of the adjacent blocks 22 therein.

From the foregoing, it will be appreciated that, utilizing the blocks of the instant invention, a unique planting wall can be constructed wherein a substantially completely hollow interior is provided for the reception of soil or the like as a growing medium for the plants which will be planted within the trough-like enlargements defined by the outwardly bowed portions 32. Each of these trough-like outwardly projecting plant receiving portions will communicate with an interior enlarged soil containing area providing substantial growing room for the plant roots. Also of significance is the fact that substantially the entire area of the block is utilized to contain soil in that each block, aside from the corner blocks which include diagonal bracing walls, consists solely of four peripheral walls defining a hollow chamber extending vertically completely therethrough with the plant receiving troughs consisting of lateral enlargements of these chambers. Structural stability and rigidity within the wall itself, notwithstanding the thin shell nature of the blocks, is achieved through a unique vertical and horizontal interlocking of the blocks through the utilization of stacking flanges and locking lugs which eliminate the necessity of the use of mortar or the like. Each block, through the stacking flanges and locking lugs, is permanently locked against disrupting movement in any direction to all four of the surrounding blocks. Further, various modifications in the above described block shapes can also be effected within the scope of the instant invention. For example, each of the blocks 22 can be provided with the outwardly bowed trough defining portions 32 on both side faces thereof should such be desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in the construction of a planting wall, a planting block, said block comprising a first pair of generally vertical spaced parallel walls, a second pair of vertical walls at generally right angles to the first pair of walls and interconnecting the ends thereof to define a generally rectangular hollow block having a vertical chamber completely therethrough, at least one of said first pair of walls including an outwardly bowed portion defining an upwardly opening lateral enlargement of the vertical chamber, at least one of the walls of said second pair being planar so as to define a flat abutment face for engagement against a similar wall of an adjacent block, locking means on said one wall of the second pair of walls for locking this wall to a wall of an adjacent block, and a pair of elongated depending stacking flanges on said first pair of walls, the flange on said one wall of the first pair being offset inwardly thereof a distance generally equal to the thickness of this wall.

2. For use in the construction of a planting wall, a planting block, said block comprising a first pair of generally vertical spaced parallel walls, a second pair of vertical walls at generally right angles to the first pair of walls and interconnecting the ends thereof to define a generally rectangular hollow block having a vertical chamber completely therethrough, at least one of said first pair of walls including an outwardly bowed portion defining an upwardly opening lateral enlargement of the vertical chamber, said bowed portion curving upwardly and outwardly from the bottom of the corresponding wall and terminating in an outwardly spaced upper edge, at least one of the walls of said second pair being planar so as to define a flat abutment face for engagement against a similar wall of an adjacent block, locking means on said one wall of the second pair of walls for locking this wall to a wall of an adjacent block, and a pair of elongated depending stacking flanges on said first pair of walls, the flange on said one wall of the first pair being offset inwardly thereof a distance generally equal to the thickness of this wall.

3. The planting block of claim 2 wherein said locking means comprises a recess defined within the upper edge of the one wall of the second pair for the close reception of a locking lug of an adjacent block therein.

4. The planting block of claim 3 wherein the second of said first pair of walls is planar with the flange thereon constituting a reduced length coplanar extension thereof.

5. The planting block of claim 3 wherein the second wall of the second pair of walls includes an outwardly directed locking lug thereon receivable within the locking recess of an adjacent block, said lug including a depending flange on the outer end thereof for depending engagement within an adjacent block.

6. The planting block of claim 2 wherein the second wall of said second pair of walls includes an outwardly bowed portion defining an upwardly opening lateral enlargement of the vertical chamber and constituting a right angular continuation of the first mentioned enlargement.

7. For use in the construction of a planting wall, a planting block, said block being generally rectangular and comprising four peripheral walls defining a hollow chamber having an open top and an open bottom, a first one of said walls having an outwardly projecting lug centrally thereon adjacent the upper edge thereof, a second wall opposite said first wall having a recess defined centrally therein adjacent the upper edge thereof, said recess being of generally the same width and depth as said lug for the reception of a similar lug of an adjacent similar block, the third and fourth walls, extending between the corresponding ends of said first and second walls, including integral depending stacking flanges, each flange being of a length generally equal to the distance between the first and second walls, one of said flanges being offset laterally inward relative to its corresponding wall.

References Cited
UNITED STATES PATENTS

| | | | |
|---|---|---|---|
| 814,595 | 3/1906 | Eggleton | 47—34.12 XR |
| 986,395 | 3/1911 | King | 47—33 |
| 1,503,931 | 8/1924 | Wightman | 47—34.12 XR |
| 1,927,257 | 9/1933 | Czajkowski | 52—575 |
| 2,513,711 | 7/1950 | Cain | 47—34.12 |
| 2,514,536 | 7/1950 | Burney | 47—33 |
| 3,073,061 | 1/1963 | Pearson | 47—34 |

ROBERT E. BAGWILL, *Primary Examiner.*